(12) United States Patent
Watanabe et al.

(10) Patent No.: US 12,214,445 B2
(45) Date of Patent: Feb. 4, 2025

(54) INCLINED STRUCTURE AND METHOD OF MANUFACTURING SAME

(71) Applicant: KAWASAKI JUKOGYO KABUSHIKI KAISHA, Kobe (JP)

(72) Inventors: Kentaro Watanabe, Himeji (JP); Ryo Morihashi, Kobe (JP); Hiroka Fujita, Nishinomiya (JP); Yoshikatsu Sato, Kakogawa (JP); Hayato Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 803 days.

(21) Appl. No.: 17/288,846

(22) PCT Filed: Oct. 17, 2019

(86) PCT No.: PCT/JP2019/040911
§ 371 (c)(1),
(2) Date: Apr. 26, 2021

(87) PCT Pub. No.: WO2020/085194
PCT Pub. Date: Apr. 30, 2020

(65) Prior Publication Data
US 2022/0001491 A1 Jan. 6, 2022

(30) Foreign Application Priority Data

Oct. 26, 2018 (JP) ................................ 2018-201394

(51) Int. Cl.
*B23K 26/342* (2014.01)
*B22F 10/28* (2021.01)
(Continued)

(52) U.S. Cl.
CPC ............. *B23K 26/342* (2015.10); *B22F 10/28* (2021.01); *B33Y 10/00* (2014.12); *B33Y 80/00* (2014.12)

(58) Field of Classification Search
CPC .......... B22F 10/22; B22F 10/28; B22F 10/38; B23K 26/342; B23K 9/042; B33Y 10/00; B33Y 80/00; Y02P 10/25
See application file for complete search history.

(56) References Cited

U.S. PATENT DOCUMENTS 5,233,150 A    8/1993  Schneebeli et al.
2017/0120385 A1  5/2017 Tsuji et al.
(Continued)

FOREIGN PATENT DOCUMENTS

JP     H04-336304 A    11/1992
JP     6200599 B1       9/2017
(Continued)

*Primary Examiner* — Joe E Mills, Jr.
(74) *Attorney, Agent, or Firm* — Oliff PLC

(57) ABSTRACT

A method of manufacturing an inclined structure extending in an oblique direction from a surface of a base metal includes: forming a base portion by stacking a plurality of build-up layers on the surface of the base metal, each of the plurality of build-up layers being formed by a plurality of beads, the base portion including a reference surface inclined at an opposite side of the oblique direction across a perpendicular line of the surface of the base metal; and forming a projecting portion by stacking a plurality of build-up layers on the reference surface of the base portion, each of the plurality of build-up layers being formed by a plurality of beads, the projecting portion extending in the oblique direction from the base portion.

12 Claims, 5 Drawing Sheets

(51) Int. Cl.
*B33Y 10/00* (2015.01)
*B33Y 80/00* (2015.01)

(56) References Cited

U.S. PATENT DOCUMENTS

| | | |
|---|---|---|
| 2018/0141159 A1 | 5/2018 | Niitani et al. |
| 2019/0240903 A1 | 8/2019 | Isobe et al. |
| 2019/0375011 A1 | 12/2019 | Nakamura et al. |
| 2019/0377326 A1* | 12/2019 | Katogi .............. B23K 26/0853 |
| 2019/0389004 A1 | 12/2019 | Yamasaki |

FOREIGN PATENT DOCUMENTS

| | | |
|---|---|---|
| JP | 2018-126760 A | 8/2018 |
| WO | 2018/079467 A1 | 5/2018 |
| WO | 2018/097298 A1 | 5/2018 |

* cited by examiner

INCLINED STRUCTURE AND METHOD OF MANUFACTURING SAME

TECHNICAL FIELD

The present invention relates to an inclined structure extending in an oblique direction from a surface of a base metal, and a method of manufacturing the inclined structure.

BACKGROUND ART

An inclined structure extending in an oblique direction from a surface of a base metal can be manufactured by build-up welding. For example, FIG. 5 of PTL 1 shows that the inclined structure is manufactured by MIG (Metal Inert Gas) welding.

Moreover, PTL 1 describes that the inclined structure can be manufactured without a supporting body when an angle of the inclined structure to a perpendicular line of the surface of the base metal is 33° or less (see paragraph 0022 in Detailed Description of the Invention). In other words, when an angle between the surface of the base metal and an inclination direction of the inclined structure is less than 57°, manufacturing the inclined structure without the supporting body is not realized.

CITATION LIST

Patent Literature

PTL 1: Japanese Laid-Open Patent Application Publication No. 4-336304

SUMMARY OF INVENTION

Technical Problem

An object of the present invention is to provide a method of manufacturing an inclined structure having any inclination direction without a supporting body, and an inclined structure manufactured by such manufacturing method.

Solution to Problem

To solve the above problem, a method of manufacturing an inclined structure according to the present invention is a method of manufacturing an inclined structure extending in an oblique direction from a surface of a base metal, the method including: forming a base portion by stacking a plurality of build-up layers on the surface of the base metal, each of the plurality of build-up layers being formed by a plurality of beads, the base portion including a reference surface inclined at an opposite side of the oblique direction across a perpendicular line of the surface of the base metal; and forming a projecting portion by stacking a plurality of build-up layers on the reference surface of the base portion, each of the plurality of build-up layers being formed by a plurality of beads, the projecting portion extending in the oblique direction from the base portion.

According to the above configuration, the reference surface inclined relative to the surface of the base metal is formed at first, and then, the plurality of build-up layers are staked on the reference surface. Therefore, the inclined structure having any inclination direction can be manufactured without a supporting body.

As shown in FIG. 5 of PTL 1, when the inclined structure is manufactured by stacking the plurality of build-up layers on the surface of the base metal such that the plurality of build-up layers are shifted little by little, crystal grains in the inclined structure form a columnar shape along a stacking direction (direction vertical to the surface of the base metal). Therefore, creep strength in a build direction of the inclined structure is not so high. On the other hand, in the inclined structure manufactured by the above manufacturing method, the crystal grains in the projecting portion of the inclined structure form a columnar shape along the build direction of the inclined structure. Therefore, high creep strength can be obtained in the build direction of the inclined structure.

For example, the inclined structure may have an annular shape which increases or decreases in diameter in a direction away from the base metal.

Stacking of the plurality of build-up layers on the surface of the base metal and stacking of the plurality of build-up layers on the reference surface of the base portion may be performed by laser metal deposition. According to this configuration, since heat input to the base metal becomes small, a heat affected zone (HAZ) of the base metal can be made small. Moreover, since the stacking of the build-up layers on the reference surface of the base portion is also performed by the laser metal deposition, the base portion and the projecting portion can be consecutively formed.

Powder may be used as a welding material in the laser metal deposition. When stacking the plurality of build-up layers on the reference surface, each of the build-up layers may be formed such that the beads are arranged in order from a side close to the base metal. In the case where the build-up layers are stacked on the reference surface by forming each of the build-up layers such that the beads are arranged in order from a side far from the base metal, when forming the second and following beads, the powder scattering around a molten pool tends to remain between the existing bead and the base metal. In contrast, when the beads are arranged in order from the side close to the base metal, the second and following beads can be formed with high quality in each of the build-up layers.

When stacking the plurality of build-up layers on the surface of the base metal, each of the build-up layers may be formed such that the beads are arranged in order from a side close to the reference surface. According to this configuration, the reference surface having small unevenness can be formed.

Moreover, an inclined structure of the present invention is an inclined structure extending in an oblique direction from a surface of a base metal, the inclined structure including: a base portion made of metal and formed on the surface of the base metal, the base portion including crystal grains which form a columnar shape along a direction vertical to the surface of the base metal; and a projecting portion made of metal and extending in the oblique direction from the base portion, the projecting portion including crystal grains which form a columnar shape along the oblique direction.

According to the above configuration, high creep strength can be obtained in the build direction of the inclined structure.

Advantageous Effects of Invention

According to the present invention, the inclined structure having any inclination direction can be manufactured without the supporting body.

DESCRIPTION OF EMBODIMENTS

Figure 1:
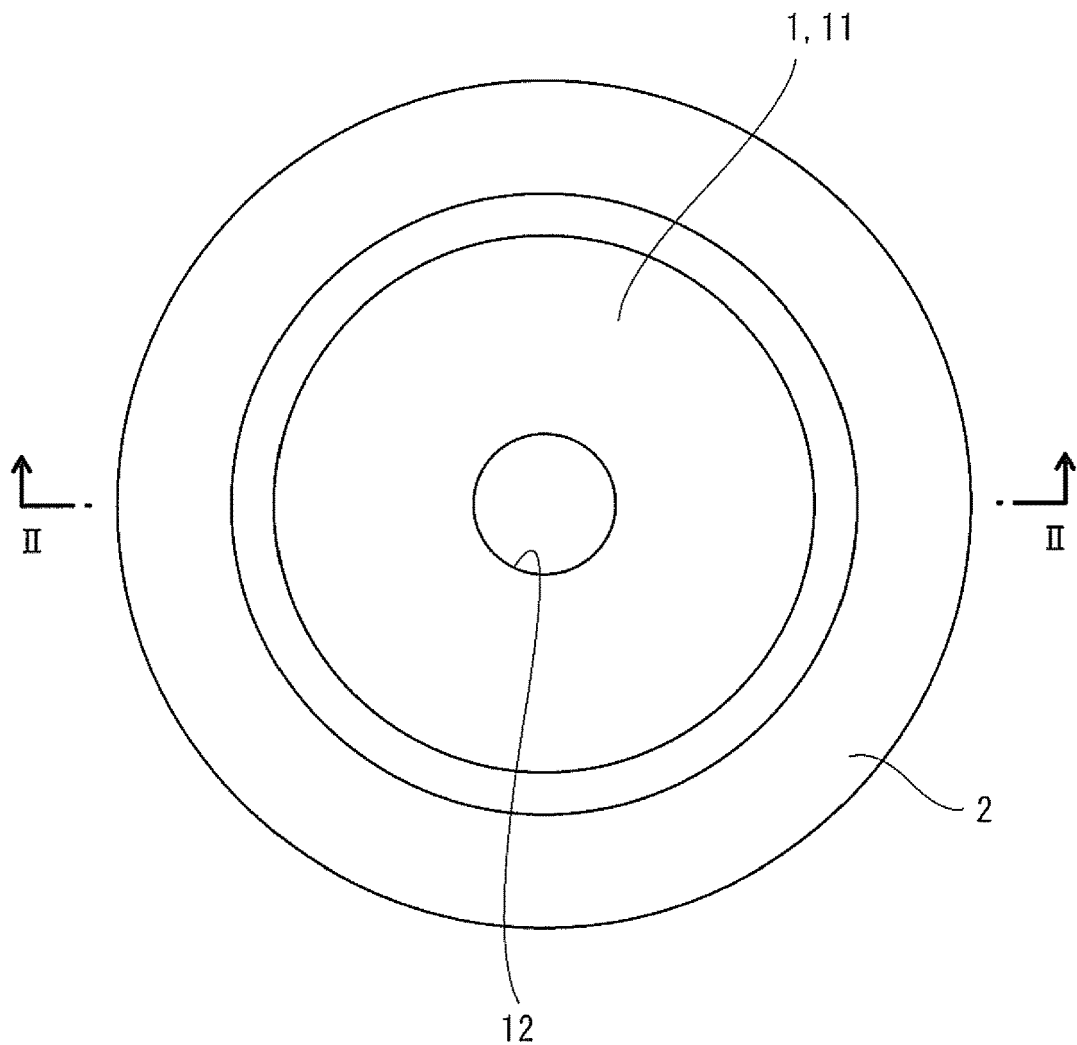
FIG. 1 is a plan view showing an inclined structure manufactured by a manufacturing method according to one embodiment of the present invention and a base metal supporting the inclined structure.
Figure 2:
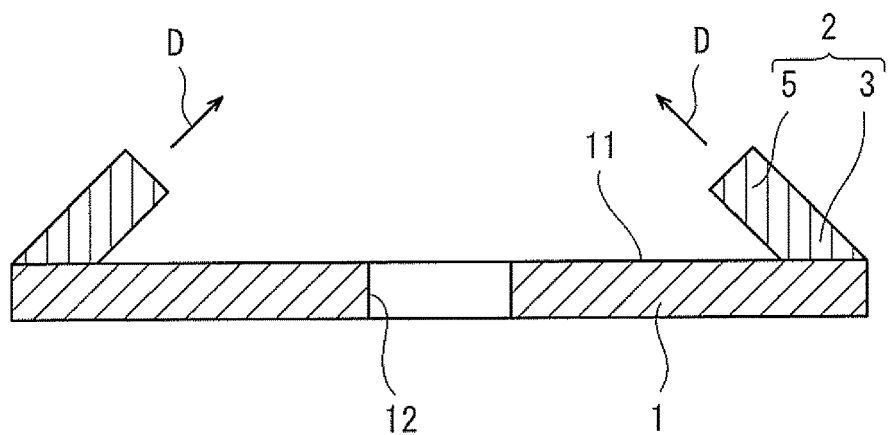
FIG. 2 is a sectional view taken along line II-II of FIG. 1.

As shown in FIGS. 1 and 2, an inclined structure 2 extending in an oblique direction D from a surface 11 of a base metal 1 is manufactured by a manufacturing method according to one embodiment of the present invention.

In the present embodiment, the base metal 1 has a disc shape including a through hole 12 at a center thereof. However, the shape of the base metal 1 is not limited to this. The base metal 1 may have any shape (for example, a bowl shape).

Moreover, in the present embodiment, the inclined structure 2 has an annular shape which decreases in diameter in a direction away from the base metal 1. In other words, the inclined structure 2 is a tapered peripheral wall. Therefore, the above-described oblique direction D is a direction along a conical surface.

It should be noted that the inclined structure 2 may have an annular shape which increases in diameter in the direction away from the base metal 1. Or, the inclined structure 2 does not necessarily have to have an annular shape and may have an inclined plate shape or an inclined columnar shape.

The inclined structure 2 includes a base portion 3 and a projecting portion 5. The base portion 3 is formed on the surface 11 of the base metal 1. The projecting portion 5 extends in the oblique direction D from the base portion 3. The base portion 3 and the projecting portion 5 are made of metal.

Figure 3:
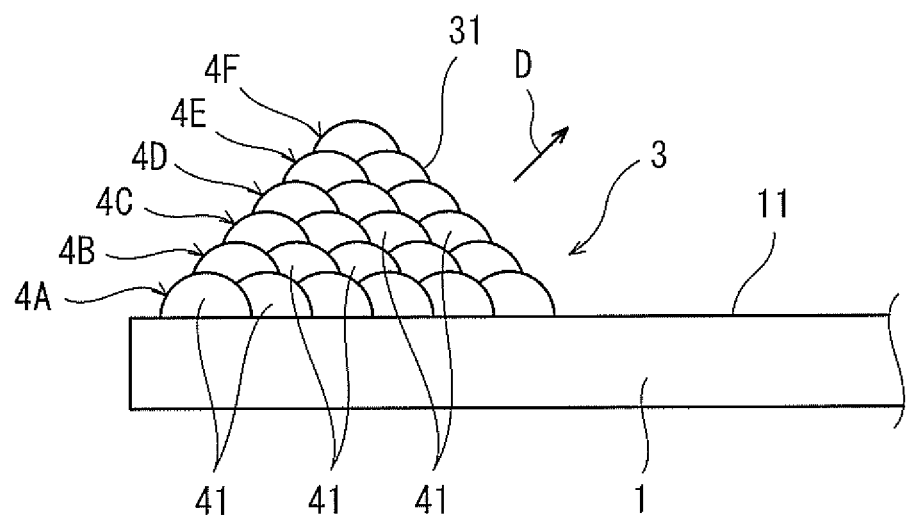
FIG. 3 is a diagram for explaining a step of forming a base portion in the manufacturing method.
Figure 5:
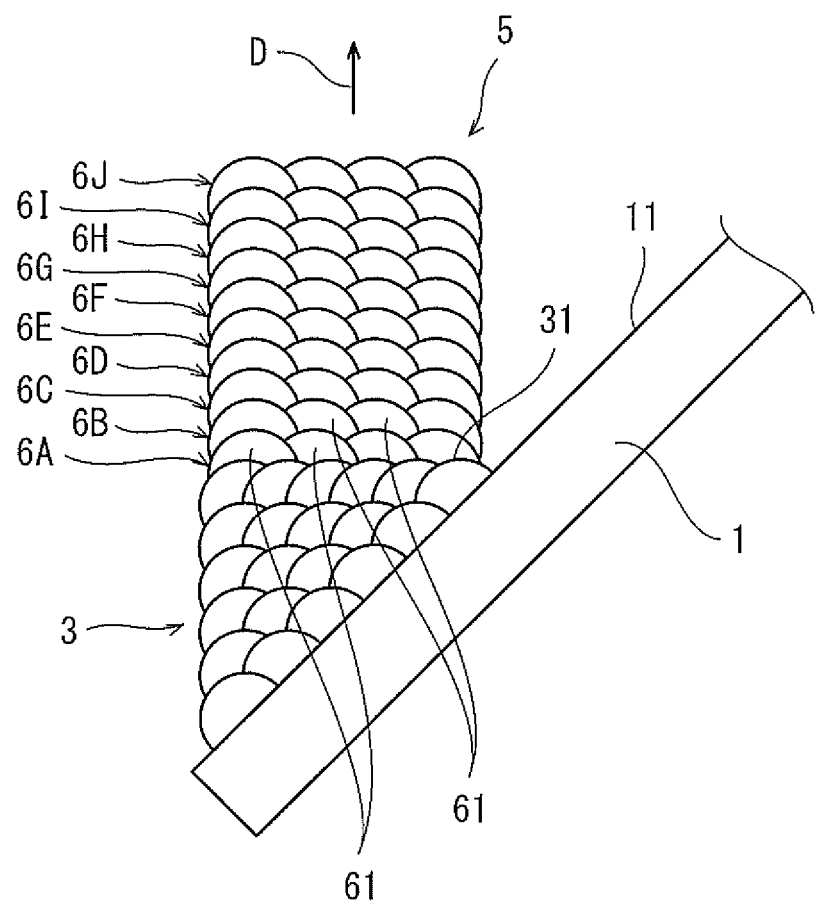
FIG. 5 is a diagram for explaining a step of forming the projecting portion in the manufacturing method.

In the present embodiment, a sectional shape of the base portion 3 is a triangular shape as shown in FIG. 3, and a sectional shape of the projecting portion 5 is a rectangular shape as shown in FIG. 5. However, the sectional shape of the base portion 3 is not especially limited as long as the base portion 3 includes a below-described reference surface 31. For example, the sectional shape of the base portion 3 may be a trapezoidal shape or may be a fan shape having two sides that are the surface 11 of the base metal 1 and the reference surface 31. Moreover, the sectional shape of the projecting portion 4 is not especially limited and may be a trapezoidal shape or a triangular shape.

As shown in FIG. 3, the base portion 3 is formed by stacking a plurality of (six in the illustrated example) build-up layers 4A to 4F on the surface 11 of the base metal 1. In the present embodiment, since the sectional shape of the base portion 3 is the triangular shape as described above, the build-up layer 4F located at an uppermost position is formed by a single bead 41, and each of the other build-up layers 4A to 4E is formed by a plurality of beads 41.

Each of all the beads 41 has an annular shape concentric with the inclined structure 2. In each of the build-up layers 4A to 4E, the beads 41 are arranged in parallel with the surface 11 of the base metal 1.

The base portion 3 includes the reference surface 31 inclined at an opposite side of the oblique direction D across a perpendicular line of the surface 11 of the base metal 1. The reference surface 31 is formed by the beads 41 which are located closest to the oblique direction D in the respective build-up layers 4A to 4F.

In the present embodiment, the stacking of the build-up layers 4A to 4F on the surface 11 of the base metal 1 is performed by laser metal deposition (LMD). However, the stacking of the build-up layers 4A to 4F on the surface 11 of the base metal 1 may be performed by another method, such as MIG welding or electron beam welding.

According to the LMD, a welding material and a shielding gas are supplied from a nozzle (not shown) toward the surface 11 of the base metal 1 or a surface of the build-up layer formed most recently, and the surface 11 of the base metal 1 or the surface of the build-up layer formed most recently is irradiated with laser beam. Thus, a molten pool is generated. The supply of the welding material and the shielding gas and the irradiation of the laser beam are performed while rotating the base metal 1 in a horizontal state, and the above molten pool becomes the bead 41. In the present embodiment, powder is used as the welding material. However, the welding material may be a wire.

When stacking the build-up layers 4A to 4F on the surface 11 of the base metal 1, it is desirable to form each of the build-up layers 4A to 4F such that the beads 41 are arranged in order from a side close to the reference surface 31 of the base portion 3 (in FIG. 3, from a right side to a left side). This is because: the reference surface 31 having small unevenness can be formed; and the reference surface 31 can be formed at an accurate angle to the surface 11 of the base metal 1.

Figure 4:
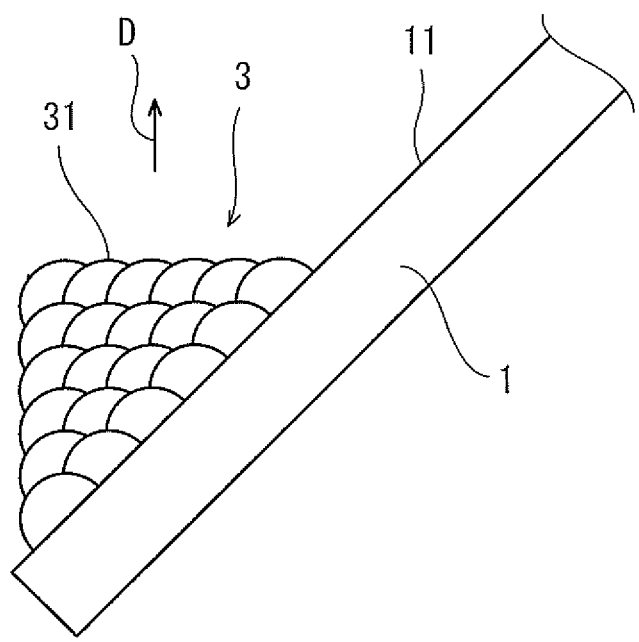
FIG. 4 is a diagram for explaining a preparing step performed before forming a projecting portion in the manufacturing method.

After the base portion 3 is formed and before the projecting portion 5 is formed, as shown in FIG. 4, the base metal 1 is inclined such that the reference surface 31 of the base portion 3 becomes horizontal at a lowermost point of the annular base portion 3. Then, the the reference surface 31 is irradiated with laser from the nozzle used in the LMD to be smoothed.

As shown in FIG. 5, the projecting portion 5 is formed by stacking a plurality of (ten in the illustrated example) build-up layers 6A to 6J on the reference surface 31 of the base portion 3. In the present embodiment, since the sectional shape of the projecting portion 5 is the rectangular shape as described above, each of all the build-up layers 6A to 6J is formed by a plurality of beads 61.

Each of all the beads 61 has an annular shape concentric with the inclined structure 2. In each of the build-up layers 6A to 6J, the beads 61 are arranged in parallel with the reference surface 31 of the base portion 3.

In the present embodiment, the stacking of the build-up layers 6A to 6J on the reference surface 31 of the base portion 3 is performed by the LMD. However, the stacking of the build-up layers 6A to 6J on the reference surface 31 of the base portion 3 may be performed by another method, such as MIG welding or electron beam welding.

According to the LMD, the welding material and the shielding gas are supplied from the nozzle (not shown) toward the reference surface 31 of the base portion 3 or a surface of the build-up layer formed most recently, and the reference surface 31 of the base portion 3 or the surface of the build-up layer formed most recently is irradiated with the laser beam. Thus, the molten pool is generated. The supply of the welding material and the shielding gas and the irradiation of the laser beam are performed while rotating the base metal 1 in an inclined state, and the above molten pool becomes the bead 61. In the present embodiment, powder is used as the welding material. However, the welding material may be a wire.

When stacking the build-up layers 6A to 6J on the reference surface 31 of the base portion 3, it is desirable to form each of the build-up layers 6A to 6J such that the beads 61 are arranged in order from a side close to the base metal 1 (in FIG. 5, from a right side to a left side). In the case where the build-up layers 6A to 6J are stacked on the reference surface 31 of the base portion 3 by forming each of the build-up layers 6A to 6J such that the beads 61 are arranged in order from a side far from the base metal 1, when forming the second and following beads, the powder scattering around the molten pool tends to remain between the existing bead and the base metal 1. In contrast, when the beads 61 are arranged in order from the side close to the base metal 1, the second and following beads can be formed with high quality in each of the build-up layers 6A to 6J.

According to the manufacturing method described as above, the reference surface 31 inclined relative to the surface 11 of the base metal 1 is formed at first, and then, the plurality of build-up layers 6A to 6J are stacked on the reference surface 31. Therefore, the inclined structure 2 having any inclination direction can be manufactured without a supporting body.

Figure 6:
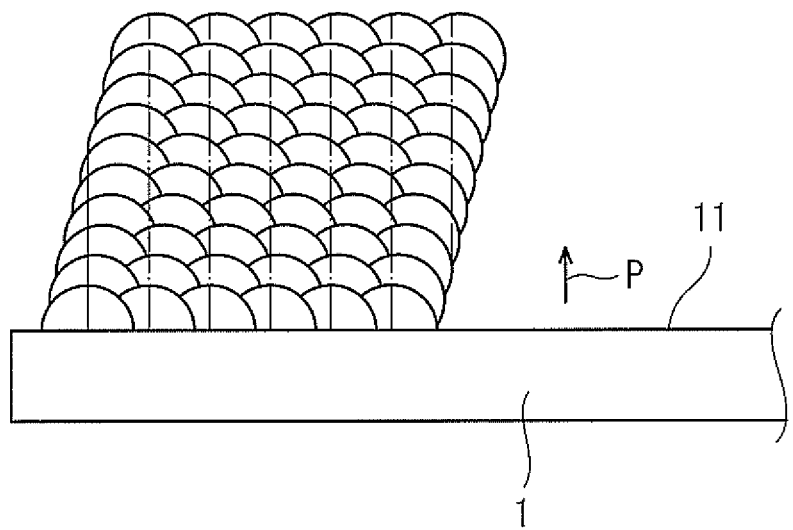
FIG. 6 is a sectional view showing the inclined structure manufactured by a conventional manufacturing method.
Figure 7:
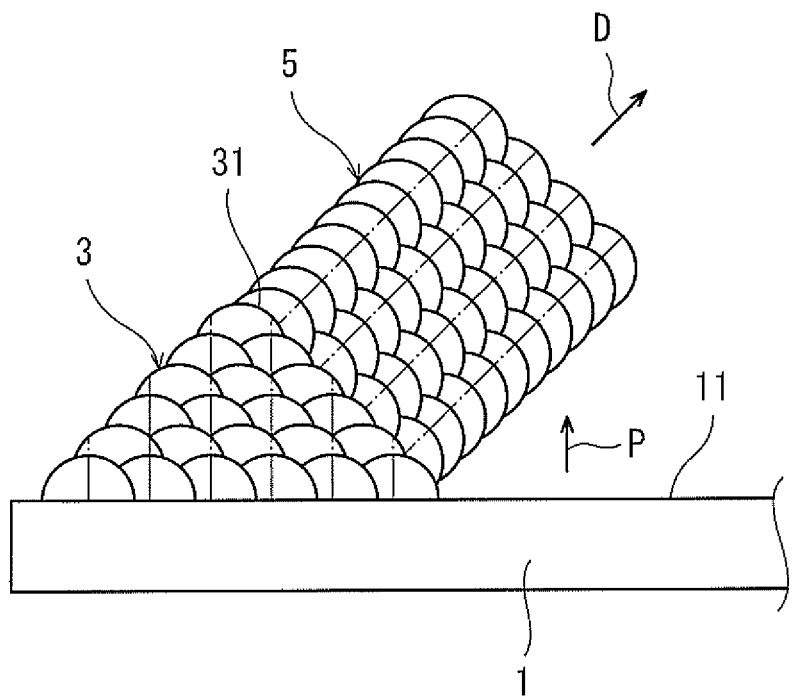
FIG. 7 is a sectional view showing the inclined structure manufactured by the manufacturing method according to the embodiment.
Figure 8:
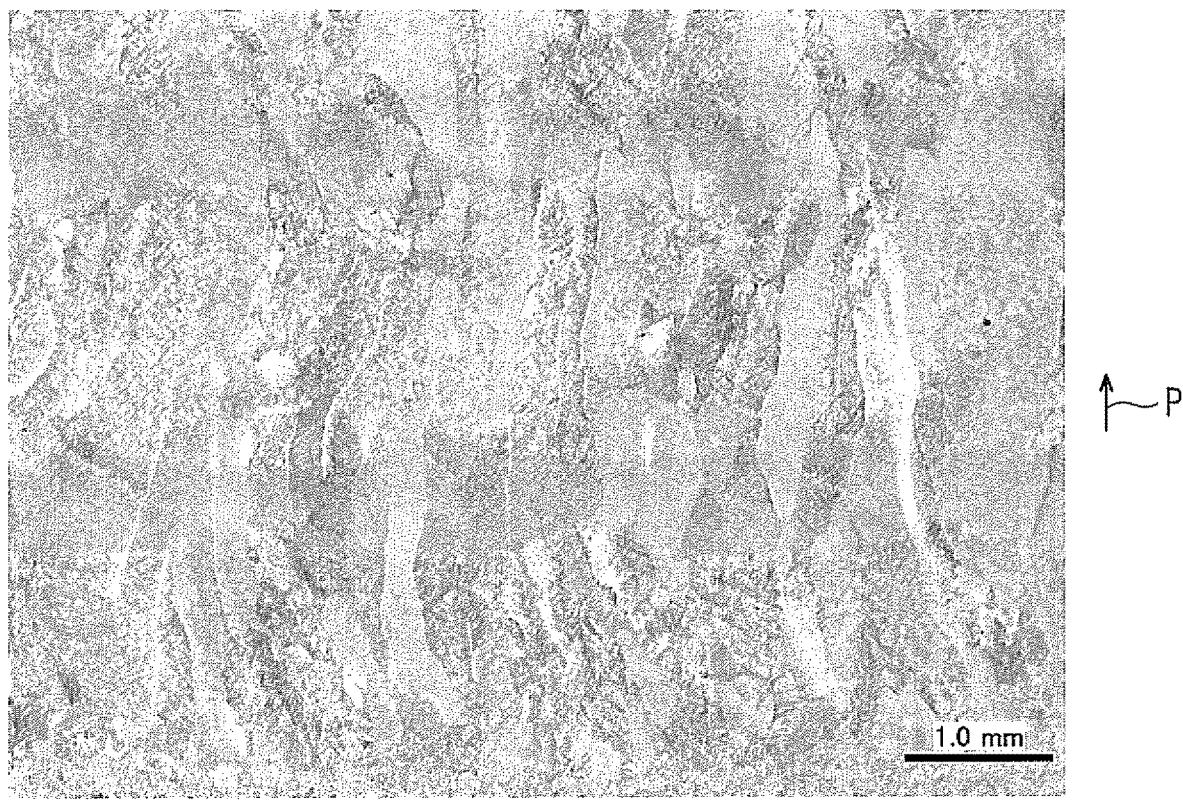
FIG. 8 is an enlarged photograph taken after a cutting surface of the inclined structure manufactured by the conventional manufacturing method is subjected to etching.

As shown in FIG. 6, when the inclined structure is manufactured by stacking a plurality of build-up layers on the surface 11 of the base metal 1 such that the plurality of build-up layers are shifted little by little, crystal grains in the inclined structure form a columnar shape along a stacking direction (direction P vertical to the surface 11 of the base metal 1) as shown in FIG. 8. To be specific, as shown by one-dot chain lines in FIG. 6, crystal grain boundaries are arranged in a direction parallel to the surface 11 of the base metal 1. Therefore, creep strength in a build direction of the inclined structure is not so high. It should be noted that FIG. 6 schematically shows some of a large number of crystal grain boundaries (the same is true in FIG. 7 described below). FIG. 8 is an enlarged photograph taken after a cutting surface of the inclined structure is subjected to etching.

On the other hand, in the inclined structure 2 manufactured by the manufacturing method of the present embodiment, the crystal grains in the base portion 3 form a columnar shape along the direction P vertical to the surface 11 of the base metal 1, and the crystal grains in the projecting portion 5 form a columnar shape along the build direction of the inclined structure 2. To be specific, as shown by one-dot chain lines in FIG. 7, the crystal grain boundaries in the projecting portion are arranged in a direction vertical to the oblique direction D. Therefore, high creep strength can be obtained in the build direction of the inclined structure 2.

Moreover, in the present embodiment, since the stacking of the build-up layers 4A to 4F on the surface 11 of the base metal 1 is performed by the LMD, heat input to the base metal 1 becomes small. Therefore, a heat affected zone (HAZ) of the base metal 1 can be made small. Moreover, in the present embodiment, since the stacking of the build-up layers 6A to 6J on the reference surface 31 of the base portion 3 is also performed by the LMD, the base portion and the projecting portion can be consecutively formed.

Modified Example

The present invention is not limited to the above embodiment. Various modifications may be made within the scope of the present invention.

For example, each of the build-up layers 4A to 4F constituting the base portion 3 does not necessarily have to be formed such that the beads 41 are arranged in order from the side close to the reference surface 31 of the base portion 3. For example, in each of the build-up layers 4A to 4F, the order of the formation of the beads 41 may be reversed.

Moreover, each of the build-up layers 6A to 6J constituting the projecting portion 5 does not necessarily have to be formed such that the beads 61 are arranged in order from the side close to the base metal 1. For example, when the amount of power scattering around the molten pool is small due to a welding condition and the like, the beads 61 located at both sides in each of the build-up layers 6A to 6J may be formed at first, and then, the beads 61 located inside may be formed.

REFERENCE SIGNS LIST 1 base metal
11 surface
2 inclined structure
3 base portion
31 reference surface
4A to 4F build-up layer
5 projecting portion
6A to 6J build-up layer

The invention claimed is:

1. A method of manufacturing an inclined structure extending in an oblique direction from a surface of a base metal, the method comprising:
    forming a base portion by stacking a plurality of build-up layers on the surface of the base metal, each of the plurality of build-up layers being formed by a plurality of beads, the base portion including a reference surface inclined at an opposite side of the oblique direction across a perpendicular line of the surface of the base metal; and
    forming a projecting portion by stacking a plurality of build-up layers on the reference surface of the base portion, each of the plurality of build-up layers being formed by a plurality of beads, the projecting portion extending in the oblique direction from the base portion.

2. The method according to claim 1, wherein the inclined structure has an annular shape which increases or decreases in diameter in a direction away from the base metal.

3. The method according to claim 1, wherein stacking of the plurality of build-up layers on the surface of the base metal and stacking of the plurality of build-up layers on the reference surface of the base portion are performed by laser metal deposition.

4. The method according to claim 3, wherein:
    powder is used as a welding material in the laser metal deposition; and
    when stacking the plurality of build-up layers on the reference surface, each of the build-up layers is formed such that the beads are arranged in order from a side close to the base metal.

5. The method according to claim 1, wherein when stacking the plurality of build-up layers on the surface of the base metal, each of the build-up layers is formed such that the beads are arranged in order from a side close to the reference surface.

6. The method according to claim 2, wherein stacking of the plurality of build-up layers on the surface of the base metal and stacking of the plurality of build-up layers on the reference surface of the base portion are performed by laser metal deposition.

7. The method according to claim 6, wherein:
powder is used as a welding material in the laser metal deposition; and
when stacking the plurality of build-up layers on the reference surface, each of the build-up layers is formed such that the beads are arranged in order from a side close to the base metal.

8. The method according to claim 2, wherein when stacking the plurality of build-up layers on the surface of the base metal, each of the build-up layers is formed such that the beads are arranged in order from a side close to the reference surface.

9. The method according to claim 3, wherein when stacking the plurality of build-up layers on the surface of the base metal, each of the build-up layers is formed such that the beads are arranged in order from a side close to the reference surface.

10. The method according to claim 4, wherein when stacking the plurality of build-up layers on the surface of the base metal, each of the build-up layers is formed such that the beads are arranged in order from a side close to the reference surface.

11. The method according to claim 6, wherein when stacking the plurality of build-up layers on the surface of the base metal, each of the build-up layers is formed such that the beads are arranged in order from a side close to the reference surface.

12. The method according to claim 7, wherein when stacking the plurality of build-up layers on the surface of the base metal, each of the build-up layers is formed such that the beads are arranged in order from a side close to the reference surface.

* * * * *